(12) United States Patent
Weinrib et al.

(10) Patent No.: US 12,610,000 B2
(45) Date of Patent: Apr. 21, 2026

(54) BLUETOOTH LOW ENERGY CONNECTION POWER CONSUMPTION

(71) Applicant: TEXAS INSTRUMENTS INCORPORATED, Dallas, TX (US)

(72) Inventors: Uri Weinrib, Mazkeret Batya (IL); Yaniv Weizman, Tel Aviv (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/539,014

(22) Filed: Nov. 30, 2021

(65) Prior Publication Data

US 2023/0171331 A1 Jun. 1, 2023

(51) Int. Cl.
*H04L 69/22* (2022.01)
*H04L 5/00* (2006.01)
*H04L 69/24* (2022.01)

(52) U.S. Cl.
CPC ............ *H04L 69/22* (2013.01); *H04L 5/0048* (2013.01); *H04L 69/24* (2013.01)

(58) Field of Classification Search
CPC ........ H04L 69/22; H04L 5/0048; H04L 69/24
See application file for complete search history.

(56) References Cited

U.S. PATENT DOCUMENTS 9,137,823 B1    9/2015  Liu
10,595,273 B2 *  3/2020  Wang ................ H04W 52/0229

10,708,859  B2     7/2020  Naftali
11,140,627  B2    10/2021  Naftali
11,582,160  B2 *   2/2023  Lohr ........................ H04L 47/32
11,582,827  B2 *   2/2023  Machani ............... H04W 76/25
12,022,553  B2 *   6/2024  Machani ................ H04W 4/80
12,484,019  B2 *  11/2025  Islam .................... H04W 68/02
2008/0186890  A1 *  8/2008  Shao ................ H04W 52/0225
                                                          370/311
2010/0293286  A1    11/2010  Nikkila
2012/0155346  A1 *   6/2012  Matsumoto ......... H04W 72/569
                                                          370/310
2012/0220351  A1 *   8/2012  Kerai .................... H04W 84/20
                                                          455/574
2012/0250537  A1    10/2012  Shatil
2012/0250731  A1    10/2012  Taghavi Nasrabadi
2012/0314636  A1    12/2012  Liu
2013/0034004  A1     2/2013  Mannemala
2013/0077546  A1 *   3/2013  Liu .................... H04W 52/0216
                                                          370/311
2014/0003399  A1     1/2014  Liu
(Continued)

FOREIGN PATENT DOCUMENTS

CN        102149173  A      8/2011
CN        103188810  A      7/2013
(Continued)

*Primary Examiner* — Dhairya A Patel
(74) *Attorney, Agent, or Firm* — Michelle F. Murray; Frank D. Cimino

(57) ABSTRACT

A method includes receiving, by a device, a portion of a data packet from a peer device during a reception time period, decoding a portion of a protocol data unit (PDU) of the data packet, decoding at least a portion of a header of the PDU, determining that the data packet is an empty packet according to the header, and aborting, by the device, reception of a remaining portion of the data packet to early terminate the reception time period.

20 Claims, 3 Drawing Sheets

(56) References Cited

U.S. PATENT DOCUMENTS

| | | | |
|---|---|---|---|
| 2014/0003406 A1* | 1/2014 | Kamath | H04W 76/25 |
| | | | 370/338 |
| 2014/0140208 A1 | 5/2014 | Cherian | |
| 2014/0376432 A1 | 12/2014 | Smith | |
| 2015/0043467 A1 | 2/2015 | Kondo | |
| 2015/0365885 A1 | 12/2015 | Yang | |
| 2016/0088567 A1 | 3/2016 | Homchaudhuri | |
| 2016/0286011 A1* | 9/2016 | Kasher | H04L 1/0083 |
| 2016/0294713 A1 | 10/2016 | Hiremath | |
| 2016/0365948 A1 | 12/2016 | Kalle | |
| 2017/0086098 A1* | 3/2017 | Kwon | H04L 47/27 |
| 2018/0152886 A1 | 5/2018 | Naftali et al. | |
| 2018/0276971 A1* | 9/2018 | Nagata | H04W 92/10 |
| 2018/0376425 A1* | 12/2018 | Zhao | H04W 52/02 |
| 2019/0246353 A1* | 8/2019 | Jensen | H04L 67/12 |
| 2020/0053831 A1* | 2/2020 | Park | H04W 4/80 |
| 2020/0137628 A1* | 4/2020 | Kandasamy | H04L 67/5651 |
| 2020/0367092 A1* | 11/2020 | Jiang | H04L 1/1861 |
| 2021/0153269 A1* | 5/2021 | Kuenzi | H04W 76/14 |
| 2021/0282204 A1* | 9/2021 | Glaenzer | H04W 24/08 |
| 2022/0069631 A1* | 3/2022 | Choi | H02J 50/90 |
| 2022/0255601 A1* | 8/2022 | Noh | H04L 1/0025 |
| 2025/0039793 A1* | 1/2025 | Elshafie | H04W 52/0216 |
| 2025/0126606 A1* | 4/2025 | Du | H04W 72/02 |

FOREIGN PATENT DOCUMENTS

| | | | |
|---|---|---|---|
| CN | 103891362 A | 6/2014 | |
| CN | 104115550 A | 10/2014 | |
| CN | 104350780 A | 2/2015 | |
| WO | 2020061912 A1 | 4/2020 | |
| WO | 2021087729 A1 | 5/2021 | |

* cited by examiner

100

101

PROCESSOR

103

TRANSCEIVER

104

MEMORY

INSTRUCTIONS

102

106

105

BUS

200

210

220

210

220

231

252

241

262

300

BLUETOOTH LOW ENERGY CONNECTION POWER CONSUMPTION

BACKGROUND

BLUETOOTH low energy (BLE) is a wireless communication technology useful for various applications and devices, such as in healthcare, fitness, security, home entertainment, and communication devices. The BLE communication technology provides for lower power consumption of the communication devices in comparison to BLUETOOTH or other wireless communication technologies, while also maintaining a similar wireless communication range and coverage. The reduced power consumption of the communication devices may be provided by a simpler modulation scheme in comparison to the other wireless communication technologies. The BLE communication technology is based on a BLE communication standard supported by various operating systems (OS), including ANDROID, IOS, WINDOWS, MACOS, LINUX, and other OS to operate the communication devices.

SUMMARY

In accordance with at least one example of the description, a method includes receiving, by a device, a portion of a data packet from a peer device during a reception time period, decoding a portion of a protocol data unit (PDU) of the data packet, decoding at least a portion of a header of the PDU, determining that the data packet is an empty packet according to the header, and aborting, by the device, reception of a remaining portion of the data packet to early terminate the reception time period.

In accordance with another example of the description, a method includes determining, at a device, that a data packet is an empty packet while receiving the data packet from a peer device during a connection event, aborting reception of the data packet before completely receiving the data packet, ending a reception time period of the data packet by entering a transmission time period, determining that the empty packet is a first empty packet exchanged with the peer device during the connection event, and transmitting a second empty packet to the peer device to end the connection event.

In accordance with another example of the description, an apparatus includes a non-transitory memory configured to store instructions and a processor coupled to the memory, where the instructions cause the processor to be configured to begin to receive a data packet from a peer device during a reception time period of a connection event, determine that the data packet is an empty packet while receiving the data packet, abort reception of a remainder of the data packet before completely receiving the data packet responsive to determining that the data packet is the empty packet, and end the reception time period of the data packet by entering a transmission time period.

BRIEF DESCRIPTION OF THE DRAWINGS

For a detailed description of various examples, reference will now be made to the accompanying drawings.

DETAILED DESCRIPTION

Figure 1:
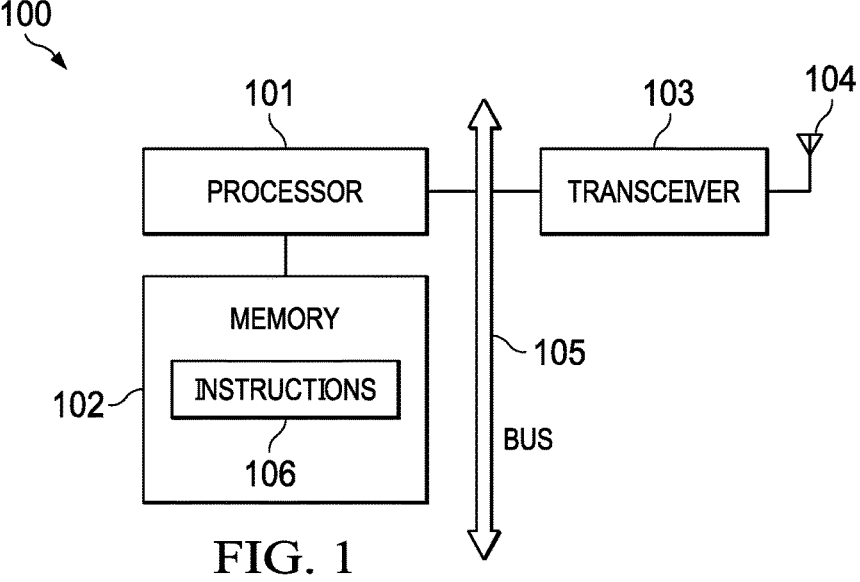
FIG. 1 is a block diagram of a hardware architecture for processing and exchanging data signals, in accordance with various examples.

According to the BLE communication standard, data transfers may be carried within connection events which are periodic and time synchronized between two communication devices. The communication devices, which are also referred to as peer devices, may include a central device and a peripheral device. The peripheral device may have more limited power available in comparison to the central device. For example, the peripheral device may be a sensor device or a wearable device, such as a temperature sensor or a wireless earphone, that has a smaller battery or a battery with a more limited power storage than the central device, which may be a smartphone, a tablet, or a laptop. The central device may also have a power supply other than a battery, such as a gateway or a computer device plugged to a power outlet.

A time period of the connection event between the central and peripheral devices may range from a few milliseconds to a few seconds, depending on the network and device configurations or applications. During a connection event, multiple data packets can be exchanged between the central and peripheral devices in either direction. The central device may transmit a first data packet and receive a second data packet after a delay time from the time of transmitting the first data packet. For example, the delay time may be set to approximately 150 microseconds (us) according to the BLE standard. Accordingly, the peripheral device may receive the first data packet and transmit the second data packet after the delay time. The central and peripheral devices may each transmit and receive, during a connection event, a number of data packets that is fewer than or equal to a programmed maximum number of data packets per connection event. The maximum number of data packets may be based on the OS of the central and peripheral devices. The number of data packets may also be restricted by an allocated time for the connection interval between two consecutive connection events. The connection event may be maintained while the central and peripheral devices exchange data packets. The central and peripheral devices may end the connection event if there are no more data packet exchanges during the same connection event. The central and peripheral devices may also end a connection event by exchanging empty packets without any data packets. Ending the connection event before the end of the time period of the connection event may reduce power consumption of the central and peripheral devices. As such, power consumption may be reduced over multiple connection events. To end the connection event, the central and peripheral devices may each transmit an empty packet, which may include zero bytes of packet payload (e.g., an empty payload), to indicate the end of data exchanges to the peer device. For example, the two empty packets may be transmitted by the central and peripheral devices consecutively without exchanging any other packet between the two empty packets. The header of the packet may also include a more data (MD) field or bit, which may be set to indicate that no more data is queued for sending by the central and peripheral devices.

The description provides for examples that reduce the power consumption of central and peripheral devices for ending a connection event. The connection event may include exchanging empty packets between the peer devices, such as according to the BLE communication standard. Accordingly, the data packet may include a header indicating a length of the data packet. Each of the peripheral device and central device may be configured to read the header after receiving the data packet and determine whether the length of the data packet indicates an empty packet. If the peripheral device or central device determines that the received data packet is an empty packet, the device may early terminate the reception or processing of the empty packet before receiving or processing the complete empty packet. The reception or processing of the empty packet may be early terminated after processing a first portion of the data packet that indicates that the data packet is an empty packet. Accordingly, the peripheral device or central device may abort receiving or processing the remaining second portion of the empty packet. In comparison to receiving or processing the complete empty packet, the remaining second portion of the empty packet may include an empty payload. Accordingly, the power consumption may be reduced by aborting the unnecessary reception and processing of the empty payload.

Although the examples provided in the disclosure are described with reference to the BLE communication standard, the steps and systems in the examples can be extended to other wireless communication standards and technologies, such as BLUETOOTH, WI-FI, wireless local area network (WLAN), low-power wireless personal area network (WPAN), and other suitable wireless communications technologies.

FIG. 1 is a block diagram of a hardware architecture 100 of a processing and communication system useful for processing and exchanging data signals, in accordance with various examples. The processing and communication system may be a transmitting or receiving device which is capable of establishing a connection to transmit and receive data or other packets in accordance with a BLE communication standard. For example, the processing and communication system may be a computer, mobile or Internet of Things (IoT) device, or other device capable of establishing a connection with a network, such as the Internet, or with another device for exchanging data packets. The hardware architecture 100 includes hardware components that may be part of the processing and communication system. As shown in FIG. 1, the hardware architecture 100 may include one or more processors 101 and one or more memories 102. In some examples, the hardware architecture 100 may also include one or more transceivers 103 and one or more antennas 104 for establishing wireless connections. These components may be coupled through a bus 105, or in any other suitable manner. In FIG. 1, an example in which the components are coupled through a bus 105 is shown.

The processor 101 may be configured to read and execute computer-readable instructions. For example, the processor 101 may be configured to invoke and execute instructions stored in the memory 102, including the instructions 106. The processor 101 may support one or more global systems for wireless communication. Responsive to the processor 101 transmitting a message or data, the processor 101 drives or controls the transceiver 103 to perform the transmitting.

The processor 101 also drives or controls the transceiver 103 to perform receiving, responsive to the processor 101 receiving a message or data. Therefore, the processor 101 may be considered as a control center for performing transmitting or receiving and the transceiver 103 is an executor for performing the transmitting and receiving operations.

In some examples, the memory 102 may be coupled to the processor 101 through the bus 105 or an input/output port (not shown). In other examples, the memory 102 may be integrated with the processor 101. The memory 102 is a non-transitory computer-readable medium configured to store various software programs and/or multiple groups of instructions, including instructions 106. For example, the memory 102 may include a high-speed random-access memory and/or may include a nonvolatile memory such as one or more disk storage devices, a flash memory or another nonvolatile solid-state storage device. The memory 102 may store an operating system such as ANDROID, IOS, WINDOWS, or LINUX. The memory 102 may further store a network communication program. The network communication program is useful for communication with one or more attached devices, one or more user equipments, or one or more network devices, for example. The memory 102 may further store a user interface program. The user interface program may display content of an application through a graphical interface and receive a control operation performed by a user on the application via an input control such as a menu, a dialog box, or a physical input device (not shown). The memory 102 may be configured to store the instructions 106 for implementing the various methods and processes provided in accordance with the various examples of this description.

The antenna 104 may be configured to enable the exchanging of wireless communication signals between the processing system and a network or another system or device. The antenna 104 may be configured to convert electromagnetic energy into an electromagnetic wave in free space or convert an electromagnetic wave in free space into electromagnetic energy in a transmission line. The transceiver 103 may be configured to transmit a signal that is provided by the processor 101 or may be configured to receive a wireless communication signal received by the antenna 104. In this example, the transceiver 103 may be considered a wireless transceiver.

The hardware architecture 100 may also include another communication component such as a Global Positioning System (GPS) module, cellular module, a BLUETOOTH or BLE module, Zigbee module, or a WI-FI module. The hardware architecture 100 may also support another wireless communication signal such as a satellite signal or a shortwave signal. The hardware architecture 100 may also be provided with a wired network interface or a local area network (LAN) interface to support wired communication.

In various examples, the hardware architecture 100 may further include an input/output device (not shown) such as an audio input/output device, a key input device, a display and the like. The input/output device may be configured to implement interaction between the hardware architecture 100 and a user/an external environment and may include the audio input/output device, the key input device, the display, and the like. The input/output device may further include a camera, a touchscreen, a sensor, and the like. The input/output device may communicate with the processor 101 through a user interface.

The hardware architecture 100 shown in FIG. 1 is an example of implementation in various examples of this description. During actual application, the hardware architecture 100 may include more or fewer components.

Figure 2:
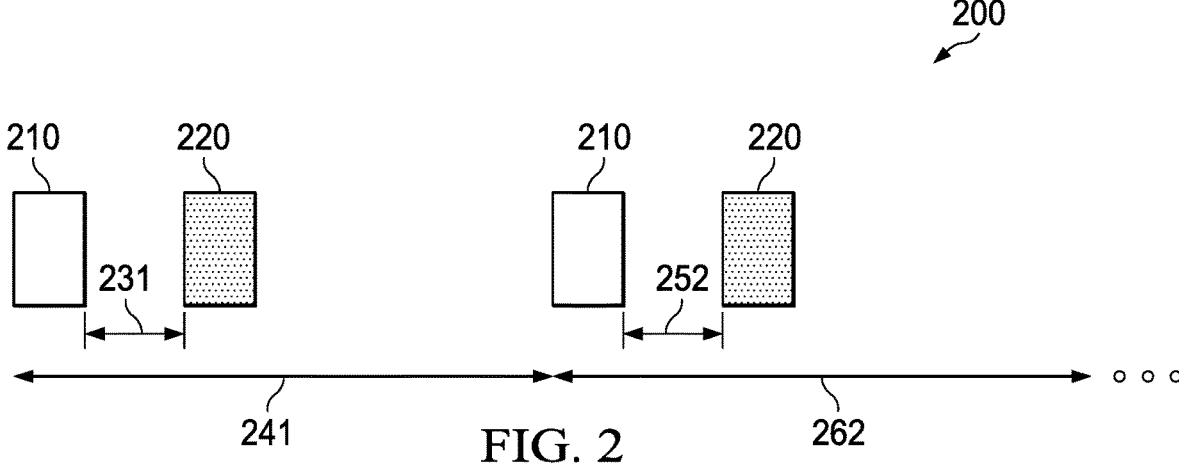
FIG. 2 is a block diagram of a data packet exchange between two devices, in accordance with various examples.

FIG. 2 shows a data packet exchange 200 between two devices, in accordance with various examples. The data packet exchange 200 may be carried between a central device 210 and a peripheral device 220 that exchange first data packets 231 in a first connection event 241 and second data packets 252 in a second connection event 262. The central device 210 and peripheral device 220 may include respective transceivers 103 configured to transmit and receive the first data packets 231 and second data packets 252 or other packets. The transceivers 103 of the central device 210 and peripheral device 220 may communicate by exchanging the first data packets 231 and second data packets 252.

The first data packets 231 and second data packets 252 may be modulated and exchanged according to the BLE communication standard. The first connection event 241 and second connection event 262 may be part of multiple periodic connection events that are time synchronized between the central device 210 and peripheral device 220. For example, each of the first connection event 241 and second connection event 262 may end according to a programmed time period for the periodic connection events. The first connection event 241 or second connection event 262 may also end before the end of the programmed time period if the first data packets 231 or second data packets 252, respectively, include empty packets from each of the central device 210 and peripheral device 220. According to the BLE communication standard, the first data packets 231 and second data packets 252 may include a PDU that indicates a packet payload size. The packet payload size of an empty packet may be equal to zero. In other examples, the first data packets 231 and second data packets 252 may be exchanged between the central device 210 and peripheral device 220 according to any other suitable wireless communication standard that indicates a payload size for an empty packet.

Ending the first connection event 241 or second connection event 262 before the end of the programmed time period may reduce power consumption of the central device 210 and peripheral device 220. For example, the central device 210 and peripheral device 220 may enter a low power mode to reduce power after ending the first connection event 241 or second connection event 262 until a next connection event is started. The power savings for the central device 210 and peripheral device 220 may accumulate over multiple connection events, extending a battery lifetime of the central device 210 and peripheral device 220. For example, the central device 210 and peripheral device 220 IoT devices that transmit a small number of data packets over a short time period relative to the time period of the connection events. Examples of IoT devices include smartphones or other mobile devices, smartwatches, smart fire alarms, smart door locks, sensor devices, fitness trackers, or smart security systems. Some IoT devices may be powered by a battery and communicate with other devices via a wireless connection. For such devices, power saving during the connection events may preserve battery lifetime.

Figure 3:
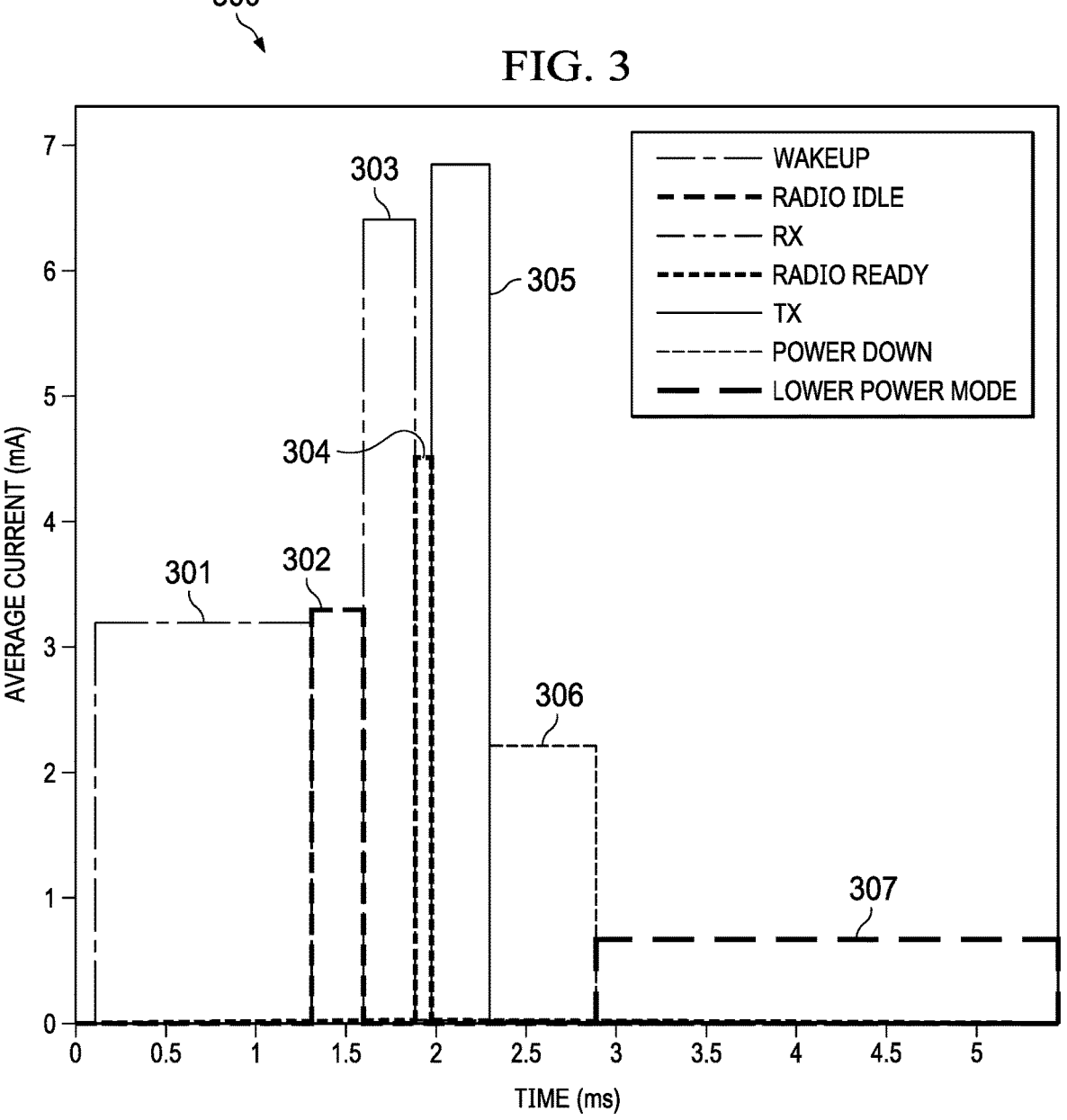
FIG. 3 is a graph showing power consumption of a peripheral device for exchanging two empty packets without a data payload, in accordance with various examples.

FIG. 3 is a graph showing power consumption 300 of the peripheral device 220 for exchanging two packets in a connection event, in accordance with various examples. For example, the two packets may be exchanged in the first data packets 231 of the first connection event 241 and similarly in the second data packets 252 of the second connection event 262 between the central device 210 and the peripheral device 220. The two packets may be empty packets, data packets carrying a non-empty payload, one of the peripheral or central device and an empty packet from the peer device, or other suitable packets. For example, the two packets may be empty packets exchanged to terminate the first connection event 241 or the second connection event 262 between the peripheral device 220 and the central device 210 before the end of the time period of the connection event. The power consumption 300 is shown on a graph in which the x-axis represents a time period in milliseconds (ms), and the y-axis represents an average current level in milliamperes (mA) that is consumed by the peripheral device 220 or the central device 210.

To exchange the two packets, the peripheral device 220 or the central device 210 may first enter a wakeup time period 301. For example, before the wakeup time period 301, the peripheral device 220 or the central device 210 may be in a low power mode, such as a standby mode. After the wakeup time period 301, the device may wait to receive a first packet by entering a radio idle time period 302. For example, during the radio idle time period 302, the transceiver 103 of the peripheral device 220 or the central device 210 may wait to receive the first packet from the peer device. The peripheral device 220 or the central device 210 may then receive and process the first packet in a reception time period 303. After receiving and processing the first packet, the peripheral device 220 or the central device 210 may enter a radio ready time period 304. For example, during the radio ready time period 304, the transceiver 103 of the peripheral device 220 or the central device 210 may prepare to transmit a second packet to the peer device. The peripheral device 220 or the central device 210 may then transmit the second packet in a transmission time period 305. After transmitting the second packet, the peripheral device 220 or the central device 210 may enter a power down time period 306. The power down time period 306 may be a transition for entering a lower power mode 307, such as a sleep mode or a standby mode. As shown in FIG. 3, the lower power mode 307 may have reduce power consumption in comparison to the power down time period 306.

As shown in FIG. 3, the reception time period 303 of the first empty packet and the transmission time period 305 of the second empty packet may have higher power consumption, in terms of average current, relative to the other time periods of operation of the peripheral device 220 or the central device 210 (e.g., operations other than transmitting or receiving packets). Accordingly, reducing the reception time period 303 of the first empty packet may reduce overall power consumption of the peripheral device 220 or the central device 210. The savings in power consumption may accumulate over multiple exchanges or connection events in which the reception time period 303 is reduced between the peripheral device 220 and central device 210.

The central device 210 exchanging the two packets with the peripheral device 220 may have similar power consumption periods as the power consumption 300. In the case of the central device 210, the reception time period 303 and the transmission time period 305 may be in a reverse order than shown in FIG. 3. To reduce the reception time period 303, the peripheral device 220 or the central device 210 may receive the empty packet and end the reception time period 303 in a shorter time by early terminating the reception or processing of the empty packet. The reception or processing of the empty packet may be terminated at an earlier time if the reception or processing of the packet is terminated before completing the reception or processing of the entire packet. After receiving or processing a first portion of the packet and determining that the packet is an empty packet, the reception or processing of the empty packet may be early terminated without receiving or processing a remaining second portion of the packet. For example, the first portion of the packet may include a length field that indicates the packet payload size. If the packet load size indicates an empty packet, the peripheral device 220 or the central device 210 may early terminate the reception or processing of the packet and enter the radio ready time period 304.

Figures 4, 5, 6, 7:
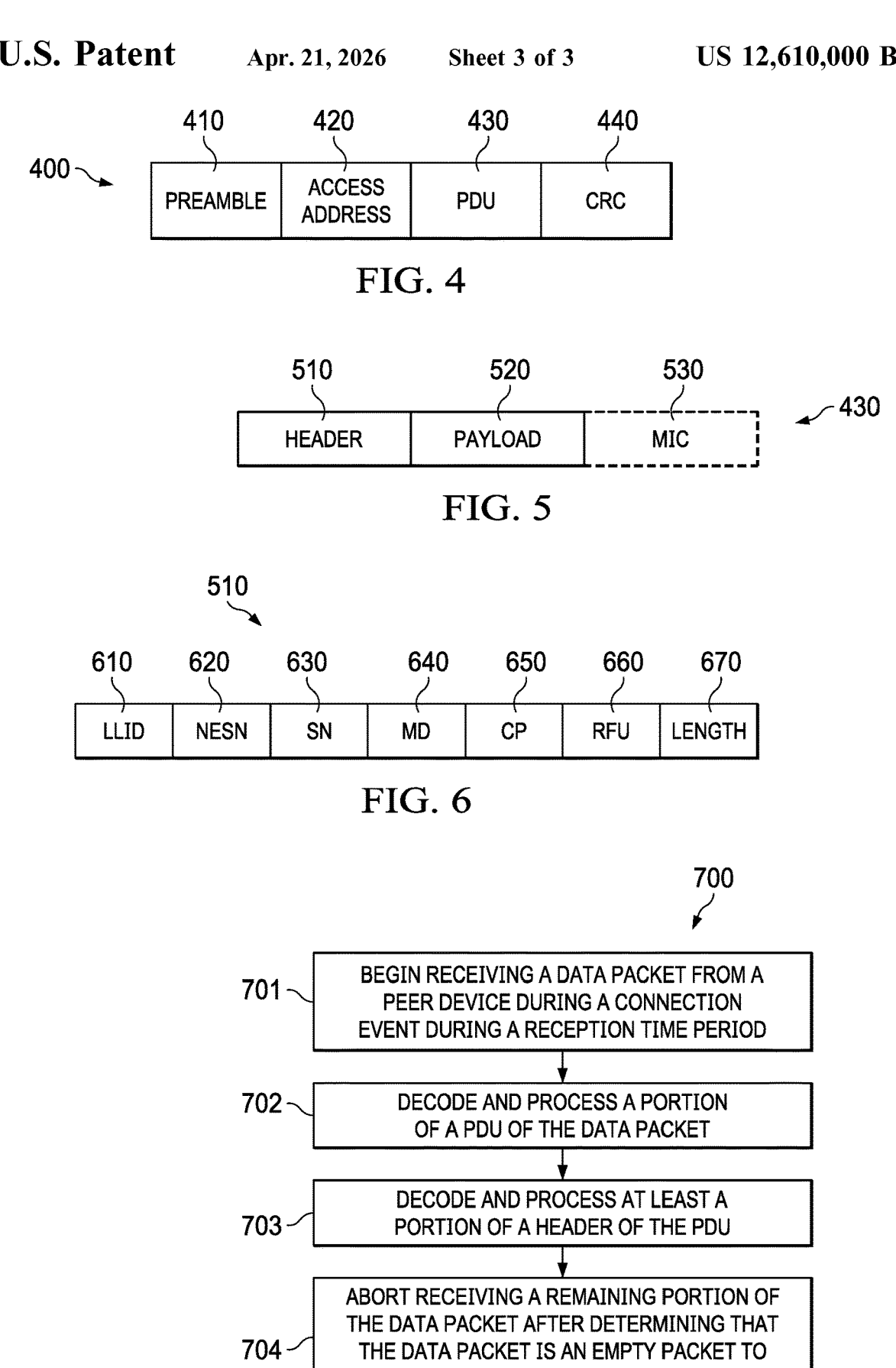
FIG. 4 is a block diagram of a data packet according to the BLE standard, in accordance with various examples.
FIG. 5 is a block diagram of a PDU of the data packet of FIG. 3, in accordance with various examples.
FIG. 6 is a block diagram of a header of the PDU of FIG. 5, in accordance with various examples.
FIG. 7 is a flow diagram of a method for early terminating a reception or processing of an empty packet, in accordance with various examples.

FIG. 4 is a block diagram of a data packet 400 according to the BLE standard, in accordance with various examples. The data packet 400 may be exchanged between the central device 210 and the peripheral device 220 in a connection event, such as the first connection event 241 or the second connection event 262. The data packet 400 may be an empty packet with a zero size payload useful for the early termination of the reception time period 303. The data packet 400 may be partitioned at the physical layer, such as according to the BLE communication standard, into a preamble 410, an access address 420, a PDU 430, and a cyclic redundancy check (CRC) field 440. The physical layer defines the transmitted stream of bits over a wireless connection between the central device 210 and the peripheral device 220.

The preamble 410 may be useful for synchronizing the data packet 400 at the physical layer between the central device 210 and the peripheral device 220. This can include identifying the order or timing of the data packet. The preamble 410 may have a size of approximately one or two bytes according to the modulation rate of the data. For example, the size of the preamble 410 may be equal to approximately one byte according to a first BLE modulation rate of one million symbols per second (1M) or may be equal to approximately two bytes according to a second BLE modulation rate with two million symbols per second (2M). The second BLE modulation rate may have two times the physical layer bit rate and half the symbol length compared to the first BLE modulation rate. The access address 420 may be useful for identifying the connection established between the central device 210 and the peripheral device 220. The access address 420 may have a size of approximately four bytes. The PDU 430 may include the packet payload that carries the data exchanged between the central device 210 and the peripheral device 220. If the data packet 400 is an empty packet, the packet payload may not include data. The PDU 430 may have a minimum size of approximately two bytes, such as for an empty packet. If the data packet 400 is not an empty packet, the size of the PDU 430 may depend on the size of data carried in the data packet 400. For example, the PDU 430 may have a maximum size of approximately 258 bytes. The CRC field 440 may be useful for an error check of the data packet 400 to protect the integrity of the exchanged data between the central device 210 and the peripheral device 220. The CRC field 440 may have a size of approximately three bytes.

FIG. 5 is a block diagram of the PDU 430, in accordance with various examples. The PDU 430 may be partitioned at the link layer, such as according to the BLE communication standard, into a header 510, a payload 520, and a message integrity check (MIC) field 530. The MIC field 530 (shown in dashed lines in FIG. 5) may be an optional field of the PDU 430. In other examples, the PDU 430 may not include a MIC field 530. The link layer is a protocol layer that provides functional and procedural protocols to transfer data between the central device 210 and the peripheral device 220 and may also provide protocols to detect and correct errors that can occur in the physical layer data exchange. The header 510 may include various information about the payload 520 in the data packet 400 such as the length of the payload 520. The header 510 may have a size of approximately 16 or 24 bits according to the modulation rate of the data.

The payload 520 may include the data exchanged between the central device 210 and the peripheral device 220. The size of the payload 520 may depend on the size of data carried in the data packet 400. For example, the payload 520 may have a maximum size of approximately 251 bytes. If the data packet 400 is an empty packet, the payload 520 may be empty and the header 510 may indicate a zero sized payload 520. The MIC field 530 may be useful to prevent attacks on the data packet 400 that may be encrypted. The encryption of the data packet 400 may include the encryption of the data in the payload 520. The MIC field 530 adds a few bytes to the data packet 400 and may be checked to determine whether the data packet 400 has been tampered with. The MIC field 530 may have a size of approximately 4 bytes.

As explained in more detail below, if the data packet 400 is an empty packet, the peripheral device 220 or the central device 210 may process the header 510 to determine that the data packet 400 is an empty packet. If the size of the payload 520 is zero, the peripheral device 220 or the central device 210 may early terminate the reception or processing of the data packet 400 without processing the CRC field 440, which may be of reduced usefulness in the case of an empty packet. As such, the reception time period 303 may be ended in a shorter time than if the data packet 400 was not an empty packet. For example, in the case of the 1M modulation rate, the peripheral device 220 or the central device 210 may process approximately 7 bytes rather than 10 or 11 bytes in the data packet 400 before terminating the reception or processing of the data packet 400. In this case, the early termination of the reception time period 303 may provide a significant reduction in power consumption during the reception time period 303 and on average during multiple reception time periods or multiple connection events. For example, an average reduction in the power consumption may reach approximately 30 percent is some applications. To achieve the reduction in power consumption, the reception time period 303 may be shortened from approximately 80 microseconds (usec) to approximately 56 usec responsive to determination that the data packet 400 is an empty packet.

FIG. 6 is a block diagram of the header 510, in accordance with various examples. The header 510 may be partitioned at the link layer, such as according to the BLE communication standard, into a link layer identifier (LLID) 610, a next expected sequence number (NESN) 620, a sequence number (SN) 630, a more data (MD) indication 640, a constant tone extension (CTE) information present (CP) indication field 650, a reserved for future use (RFU) field 660, and a length field 670. The LLID 610 may indicate whether the data packet 400 is a control type packet or a data packet carrying data in the payload 520. The LLID 610 may have a size of approximately two bits. The NESN 620 may be useful for packet flow control and retransmission, such as in examples in which multiple packets are exchanged between the central device 210 and the peripheral device 220. The NESN 620 may indicate the next expected sequence number for a next packet after the data packet 400. The NESN 620 may have a size of approximately one bit. The SN 630 may also be useful for packet flow control and retransmission, and may indicate the sequence number of the data packet 400. The SN 630 may have a size of approximately one bit. The MD indication 640 may include a value, such as one, to indicate the transmitting device, e.g., the central device 210 or the peripheral device 220, has more data to transmit in a next packet. If the MD indication 640 is set, such as to a value of zero or one based on the transmission protocol, to indicate that there is no more data to transmit, the peripheral device 220 and central device 210 may be triggered to end the connection event, such as by transmitting an empty packet. The MD indication 640 may have a size of approximately one bit. The CP indication field 650 may include a value, such as one, to indicate whether the header 510 has a CTE. The CP indication field 650 may have a size of approximately one bit. The RFU field 660 may have a size of approximately two bits and may be ignored.

The length field 670 may indicate the size of the payload 520, such as in bytes. The length field 670 may indicate a size of zero for the payload 520 if the data packet 400 is an empty packet. The length field 670 may have a size of approximately eight bits. The peripheral device 220 or the central device 210 may process the header 510 to decode the length field 670 before the remaining fields of the header 510, such as to determine whether the data packet 400 is an empty packet with a zero sized payload 520. In the case of the data packet 400 being an empty packet, the remaining fields of the header 510 may be ignored.

FIG. 7 is a flow diagram of a method 700 for early terminating a reception or processing of an empty packet, in accordance with various examples. The method 700 may be performed by a device in communication with a peer device during a connection event according to the BLE communication standard. For example, the method 700 may be performed by the peripheral device 220 or the central device 210 to early terminate the processing of a data packet 400 that is an empty packet in the first data packets 231 of the first connection event 241 or in the second data packets 252 of the second connection event 262. At step 701, the device may begin receiving a data packet from the peer device during a reception time period. For example, the peripheral device 220 may begin receiving the data packet 400 from the central device 210 during the second connection event 262. The transceiver 103 of the peripheral device 220 or the central device 210 may begin receiving the data packet 400 in the reception time period 303. At step 702, the device may decode and process a portion of a PDU of the data packet. For example, the peripheral device 220 or the central device 210 may decode the PDU 430 to process at least a portion of the PDU 430. The PDU 430 may be decoded after decoding the preamble 410 and the access address 420 during the reception time period 303.

At step 703, the device may decode and process at least a portion of a header of the PDU. For example, the peripheral device 220 or the central device 210 may decode the header 510 to process at least a portion of the header 510. The peripheral device 220 or the central device 210 may decode and process the length field 670 of the header 510 to determine whether the size of the payload 520 is equal to zero, and the data packet 400 is therefore an empty packet. The length field 670 of the header 510 may be decoded before the remaining fields of the header 510. At step 704, the device may abort receiving a remaining portion of the data packet after determining that the data packet is an empty packet, to early terminate the reception time period. For example, the peripheral device 220 or the central device 210 may abort receiving or processing the remaining portion of the data packet 400 to early terminate the reception time period 303 before receiving and decoding the complete data packet 400. Accordingly, the peripheral device 220 or the central device 210 may not decode or process an empty payload 520 of the PDU 430 and may also ignore the CRC field 440. The peripheral device 220 or the central device 210 may also ignore the remaining fields of the header 510.

If the received empty packet at the device is a first empty packet exchanged between the two communicating devices, the device may transmit a second empty packet to the peer device to end the connection event. The second empty packet may also be partially received, decoded and processed by the peer device according to the steps of the method 700. For example, after the peripheral device 220 begins receiving and processing a first empty packet from the central device 210 and early terminates receiving or processing the first empty packet to early terminate the reception time period 303, the peripheral device 220 may transmit a second empty packet to the central device 210 during the transmission time period 305. At this time, the central device 210 may be synchronized to enter a respective reception time period 303 to begin receiving the second empty packet from the peripheral device 220. The central device 210 may then early terminate receiving or processing the second empty packet to early terminate the respective reception time period 303 according to the method 700. The two communicating devices may then end the connection event.

The term "couple" appears throughout the specification. The term may cover connections, communications or signal paths that enable a functional relationship consistent with this description. For example, if device A provides a signal to control device B to perform an action, in a first example device A is coupled to device B or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device or a combination thereof.

An architecture or device that is described herein as including certain components may instead be adapted to be coupled to those components to form the described architecture or device.

Unless otherwise stated, "about," "approximately," or "substantially" preceding a value means +/−10 percent of the stated value. Modifications are possible in the described examples, and other examples are possible within the scope of the claims.

What is claimed is:

1. A method comprising:
   waking up a first device for a connection event;
   receiving, by the first device, a first portion of a data packet from a second device during a reception time period of the connection event;
   decoding, by the first device, a portion of a header of a protocol data unit (PDU) in the first portion of the data packet; and
   in response to determining, by the first device, that the data packet is an empty packet based on the header:
   aborting, by the first device, reception of a remaining portion of the data packet to early terminate the reception time period;

in response to determining that the data packet is a first empty packet exchanged with the second device during the connection event, transmitting, by the first device, a second empty packet to the second device during the connection event and after aborting the reception time period;

ending the connection event after transmitting the second empty packet; and entering a low power mode after ending the connection event.

2. The method of claim 1, further comprising early terminating, by the first device, decoding the PDU of the data packet responsive to determining that the data packet is an empty packet, the PDU including a second portion that is not decoded.

3. The method of claim 2, wherein terminating decoding the PDU prevents decoding, by the first device, of a payload of the PDU.

4. The method of claim 3, wherein the portion of the header includes a length field, the method further comprising determining that the data packet is an empty packet responsive to the length field indicating that a size of the payload is equal to zero.

5. The method of claim 2, further comprising decoding, by the first device, 7 bytes of the data packet according to a BLUETOOTH low energy (BLE) modulation scheme of one million symbols per second, the decoded 7 bytes excluding the second portion of the PDU and a cyclic redundancy check (CRC) of the data packet.

6. The method of claim 5, wherein the data packet has a total size of at least 10 bytes including the second portion of the PDU and the CRC, and wherein decoding the 7 bytes of the data packet reduces power consumption of the first device in comparison to decoding the total size of the data packet.

7. The method of claim 1, further comprising terminating, by the first device, decoding the header responsive to determining that the data packet is an empty packet, the header including a second portion that is not decoded and that includes a link layer identifier, a next expected sequence number, a sequence number, a more data indication, a constant tone extension information present indication field, and a reserved for future use field.

8. The method of claim 1, wherein at least the portion of the header is decoded at a communication protocol link layer.

9. The method of claim 1, wherein waking up the first device comprises waking up the first device from the low power mode.

10. The method of claim 1, wherein the PDU comprises a payload and a message integrity check (MIC) field after the payload.

11. A method comprising:

waking up a first device for a connection event; and in response to determining, at the first device, that a data packet is an empty packet while receiving the data packet from a second device during the connection event;

aborting, by the first device, reception of the data packet before completely receiving the data packet based on a value of a length field of a header of a protocol data unit (PDU) of the data packet to end a reception time period of the connection event;

in response to determining that the data packet is a first empty packet exchanged with the second device during the connection event, transmitting, by the first device, a second empty packet to the second device;

ending the connection event after transmitting the second empty packet; and entering a low power mode after ending the connection event.

12. The method of claim 11, wherein determining that the data packet is an empty data packet comprises determining that a payload in the data packet is an empty payload the method further comprising aborting, by the first device, decoding the empty payload to end the reception time period.

13. The method of claim 12, wherein the data packet includes a preamble, and an access address before the PDU, and a cyclic redundancy check (CRC) field after the PDU.

14. The method of claim 13, wherein the PDU includes the header before the payload.

15. The method of claim 14, wherein the header includes a link layer identifier, a next expected sequence number, a sequence number, a more data indication, a constant tone extension information present indication field, and a reserved for future use field before the length field.

16. An apparatus comprising:

a transceiver; and a processor configurable to:

wake up the apparatus for a connection event;

begin receiving a data packet, via the transceiver, from a second device during a reception time period of the connection event;

in response to determining that the data packet is an empty packet while receiving the data packet by determining that a field of a header of a protocol data unit (PDU) of the data packet is equal to zero:

abort a reception of a remainder of the data packet before completely receiving the data packet responsive to determining that the data packet is an empty packet;

in response to determining that the data packet is a first empty packet exchanged with the second device during the connection event, transmit, via the transceiver, a second empty packet to the second device during the connection event;

end the connection event after transmitting the second empty packet; and enter a low power mode after ending the connection event.

17. The apparatus of claim 16, wherein the processor is further configurable to:

abort the reception a payload of the data packet responsive to determining that the payload is an empty payload.

18. The apparatus of claim 16, wherein the processor is further configurable to terminate decoding of a cyclic redundancy check (CRC) of the data packet responsive to determining that the data packet is an empty packet.

19. The apparatus of claim 16, wherein the processor is further configurable to transmit the second empty packet responsive to the data packet being an empty packet.

20. The apparatus of claim 16, wherein the processor is further configurable to:

end the connection event by exchanging the first empty packet and the second empty packet with the second device.

* * * * *